(12) United States Patent
Zurko et al.

(10) Patent No.: US 8,474,006 B2
(45) Date of Patent: Jun. 25, 2013

(54) RETROSPECTIVE POLICY SAFETY NET

(75) Inventors: Mary Ellen Zurko, Groton, MA (US); George R. Blakley, III, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 12/607,633

(22) Filed: Oct. 28, 2009

(65) Prior Publication Data

US 2010/0115580 A1    May 6, 2010

Related U.S. Application Data

(63) Continuation of application No. 10/331,742, filed on Dec. 30, 2002, now abandoned.

(51) Int. Cl.
*G06F 21/00* (2006.01)

(52) U.S. Cl.
USPC .................................................. 726/1; 726/27

(58) Field of Classification Search
None
See application file for complete search history.

(56) References Cited

U.S. PATENT DOCUMENTS

| | | | |
|---|---|---|---|
| 4,956,769 A | 9/1990 | Smith | |
| 5,557,747 A | 9/1996 | Rogers et al. | |
| 5,991,877 A | 11/1999 | Luckenbaugh | |
| 6,275,825 B1 | 8/2001 | Kobayashi et al. | |
| 6,314,409 B2 | 11/2001 | Schneck et al. | |
| 6,327,618 B1 | 12/2001 | Ahlstrom et al. | |
| 6,339,826 B2 | 1/2002 | Hayes, Jr. et al. | |
| 6,408,336 B1 | 6/2002 | Schneider et al. | |
| 6,470,339 B1 | 10/2002 | Karp et al. | |
| 6,484,261 B1 | 11/2002 | Wiegel | |
| 6,499,110 B1 | 12/2002 | Moses et al. | |
| 6,711,687 B1 * | 3/2004 | Sekiguchi | 726/23 |
| 6,941,455 B2 | 9/2005 | Aull | |
| 2002/0095524 A1 | 7/2002 | Sanghvi et al. | |
| 2002/0124086 A1 | 9/2002 | Mar | |
| 2002/0138726 A1 | 9/2002 | Sames et al. | |
| 2002/0166052 A1 | 11/2002 | Garg et al. | |

FOREIGN PATENT DOCUMENTS

| | | |
|---|---|---|
| JP | 7141296 | 6/1995 |
| WO | WO02011373 | 2/2002 |
| WO | WO0221373 | 3/2002 |
| WO | WO0221803 | 3/2002 |

OTHER PUBLICATIONS

Ford, W.R., "Administration in the Multiple Policy/Domain Environment: The Administration and Melding of Disparate Policies", Proceedings of the New Security Paradigms Workshop, Aug. 1995.

* cited by examiner

*Primary Examiner* — Hadi Armouche
*Assistant Examiner* — Izunna Okeke
(74) *Attorney, Agent, or Firm* — Scully, Scott, Murphy & Presser, P.C.; Jeff Tang, Esq.

(57) ABSTRACT

These and other objectives are attained with a method and system for evaluating an access policy change. The method comprises the step of providing an access control mechanism having a first policy, and an audit log having entries of accesses made under that first policy. The method comprises the further steps of submitting a second policy to the access control mechanism, comparing the log entries to the second policy, and based on the results of the comparing step, taking one of a predetermined number of actions.

17 Claims, 1 Drawing Sheet

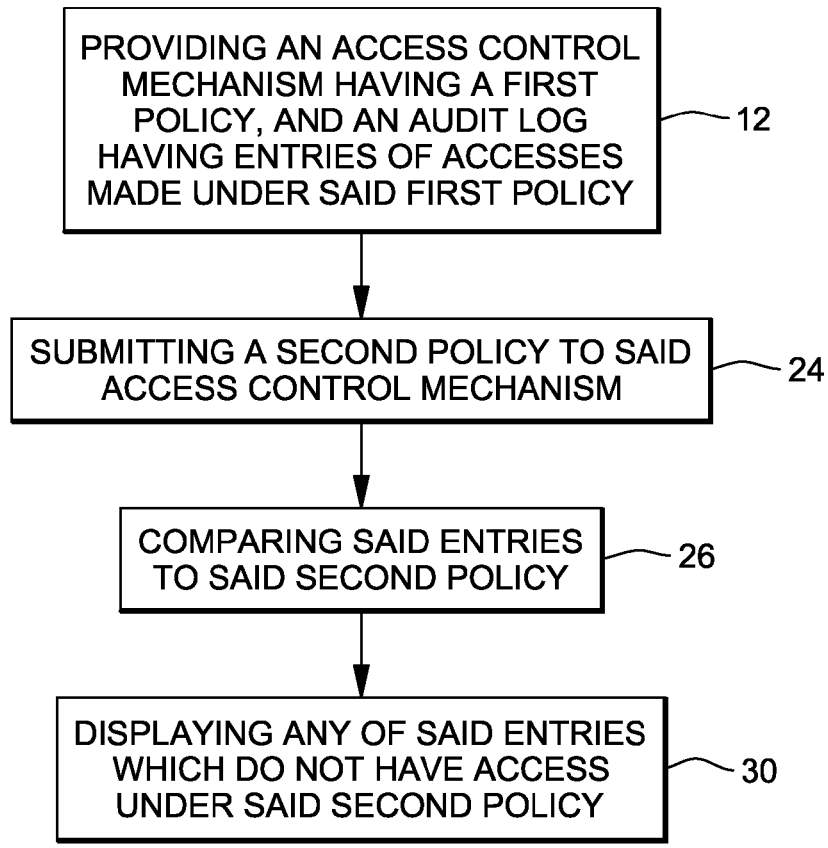
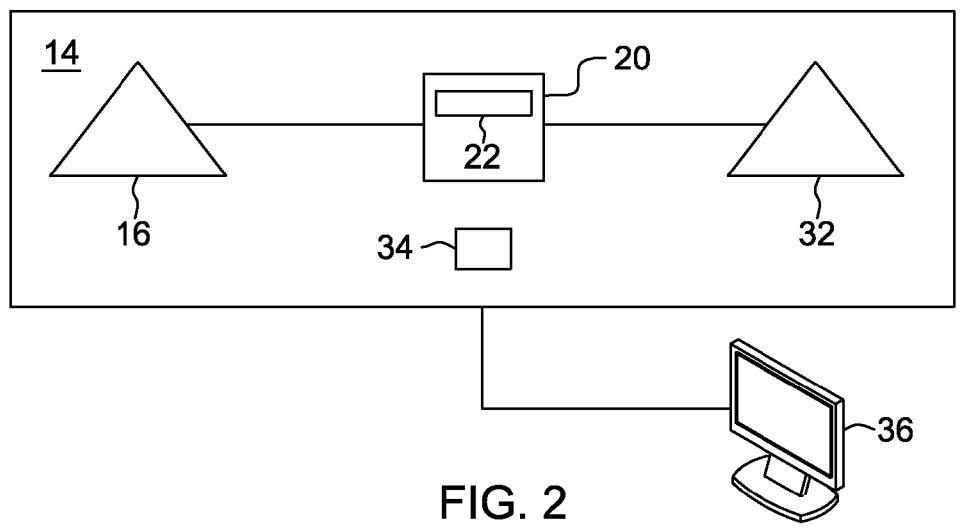

RETROSPECTIVE POLICY SAFETY NET

CROSS-REFERENCE TO RELATED APPLICATIONS

This application is a continuation of U.S. Ser. No. 10/331,742, filed Dec. 30, 2002.

BACKGROUND OF THE INVENTION

1. Field of the Invention

This invention generally relates to methods and systems for evaluating access policy changes, and more specifically, to methods and systems for determining how a policy change would have influenced past actions as a predictor for future problems.

2. Background Art

It is often difficult for computer network administrators to be sure they are doing something both secure and efficient when they change policy information that controls user behavior. Prior art procedures for changing policy information generally focus on controlling access to information but do not apply to all potentially restrictive policy information.

An administrator may discover that some resource, like a discussion database, has its Access Control List (ACL) set to allow anyone to read it. To tighten security, they will remove that entry. Now, they need to be concerned with a surge of help desk calls from the people who were relying on that access to get their job done, who are not explicitly listed in the remaining ACL.

The concept of one active policy and several latent policies is known. Latent policies can be queried against before becoming active, to understand the impact of changes. However, most administrators who change policies do not know what to check, and what to ask about, and do not have the time to think about it.

SUMMARY OF THE INVENTION

An object of this invention is to improve methods and systems for evaluating access policy changes.

Another object of the invention is to determine how a policy change would have influenced past actions.

A further object of the present invention is to compare a policy change against some history of past actions and to tell a computer network administrator what happened in the past that could not happen in the future because of this change.

A further object of the invention is to make changes to a policy based on a comparison with a past policy and a prediction about how important that change will be going forward.

These and other objectives are attained with a method and system for evaluating an access policy change. The method comprises the step of providing an access control mechanism having a first policy, and an audit log having entries of accesses made under that first policy. The method comprises the further steps of submitting a second policy to the access control mechanism, comparing the log entries to the second policy, and based on the results of the comparing step, taking one of a predetermined number of actions.

For example, these predetermined actions may be (i) making the change with a warning, (ii) rejecting the change, (iii) making a different change so that the things that happened in the log are still allowed, but some other things are not allowed (newly disallowed), and (iv) displaying the problem to the administrator and let them decide what to do. The choice among these actions might be configured in a number of ways. For instance, sites can configure which of those actions are appropriate. Alternatively, which actions the system takes can be based on information in the policies, in the changes, in the users that would be denied or their attributes, or in the actions that would be denied and their attributes. For example, a configuration could say that if the users who would be denied an access are listed in the corporate directory as active employees and the action that they took that would be denied is less than one week old, alter the policy to continue to allow the action and log the warning to an administrator.

Also, the invention may be embodied in a live system. In one embodiment, further steps may include submitting either or both of the second policy or the changes to the first policy that produce that second policy. In addition, in a preferred procedure, the present invention can tell someone changing a policy how that policy change would have influenced past (retrospective) actions. It compares the policy change against some history of past actions, and tells the administrator what happened in the past that could not happen in the future because of this change. The administrator can consider whether that is going to be desirable or not. The preferred procedure includes configuring which of a set of four courses of action to take.

Further benefits and advantages of the invention will become apparent from a consideration of the following detailed description, given with reference to the accompanying drawings, which specify and show preferred embodiments of the invention.

BRIEF DESCRIPTION OF THE DRAWING

FIG. 1 is a flow chart illustrating a preferred procedure embodying this invention.

FIG. 2 illustrates the operation of this invention.

DETAILED DESCRIPTION OF THE PREFERRED EMBODIMENTS

This invention, generally, relates to a method and system for evaluating access policy changes. With references to FIGS. 1 and 2, the method comprises the step 12 of providing an access control mechanism 14 having a first policy 16, and an audit log 20 having entries 22 of accesses made under that first policy. The method comprises the further steps, represented at 24, 26 and 30, respectively, of submitting a second policy 32 to the access control mechanism, comparing at 34 the log entries to the second policy, and based on the results of the comparing step, taking one of a predetermined number of actions.

For example, these predetermined actions may be (i) making the change with a warning, (ii) rejecting the change, (iii) making a different change so that the things that happened in the log are still allowed, but some other things are not allowed (newly disallowed), and (iv) displaying, as represented at 36, the problem to the administrator and let them decide what to do. The choice among these actions might be configured in a number of ways. For instance, sites can configure which of those actions are appropriate. Alternatively, which actions the system takes can be based on information in the policies, in the changes, in the users that would be denied or their attributes, or in the actions that would be denied and their attributes. For example, a configuration could say that if the users who would be denied an access are listed in the corporate directory as active employees and the action that they took that would be denied is less than one week old, alter the policy to continue to allow the action and log the warning to an administrator.

The present invention, it may be noted, may be embodied in a live system. In addition, in a preferred procedure, the present invention can tell someone changing a policy how that policy change would have influenced past (retrospective) actions. It compares the policy change against some history of past actions, and tells the administrator what happened in the past that could not happen in the future because of this change. The administrator can consider whether that is going to be desirable or not. The preferred procedure includes configuring which of a set of four courses of action to take.

The most straightforward implementation of this invention involves a simple access control mechanism (say an ACL) and a log or audit history of actions that were controlled by the access control mechanism. For example, take a Domino ACL with the ability to compute a person's current effective access, and an audit log of accesses to a Domino database that includes the identity of the person taking the action and the particular action. The actions that can be taken are directly mapped to permissions in the ACL via a table. For example, the read action is mapped to the reader level.

When a change to the ACL is being made or proposed, with any suitable algorithm, some number of audit entries are compared against the new ACL. The effective access of the person in the audit entry is calculated, and that access is compared to the action in the audit record. If the action in the audit record is no longer allowed, it is displayed for the administrator in some form that allows the administrator to understand what it was and why it would be no longer allowed by the new ACL.

The system of this invention can be configured to take a number of actions, depending on site policy. For instance, the change can be made (and a warning logged) or the change can be rejected (with notification). As another example, the system can modify the change to "fix" it, so that the past event in the audit log would still be allowed, but other events covered by the original change would be newly disallowed. This is possible for policy modifications that target a group of users, a group of actions, a group of objects, or a number of contextual constraints.

For example, if the change to an ACL is to deny an action to a group of users (or to remove a group of users from an ACL such that actions previously allowed would be denied), then a companion "fix up" change would add an entry for the single user in the conflicting audit event to allow that action, such that it would take precedence over the new group disallowed entry, or it would maintain the ability to take the action that removing an entry would disallow. Similar examples are possible for the other types of groupings.

Any suitable hardware may be used to practice the present invention. For example, any suitable computer or computer network may be used to implement the access control mechanism 14, and any suitable monitor or display 36 may be used to display the results of comparing the log entries to the second policy.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of determining how a policy change, from a first access policy to a second access policy, would have influenced past access requests, as a predictor of future problems with using the second access policy, the method comprising the steps of:
   using a computer hardware to implement an access control mechanism having a first access policy, the first access policy including a first access control list of users and identifying given actions that each of the users on the first access control list has access to;
   providing an audit log having entries of accesses made in the past to said given actions under the first access policy as provided to the access control mechanism and implemented by said computer hardware, each entry in the audit log identifying a person and an associated action;
   submitting a second access policy to said access control mechanism, the second access policy including a second access control list of users and identifying actions that each of the users on the second access control list has access to, and wherein some of the users, who made said accesses in the past to said given actions under said first access policy, are denied access to said given actions under the second access policy;
   informing an administrator of what happened in the past under the first access policy that could not happen in the future under the second access policy due to the policy change, by comparing a number of entries on the audit log to the second access control list of users to determine which of the persons, identified in said number of entries in the audit log, are not given access, according to the second access control list of users, to the actions associated with said persons in said number of entries in the audit log; and
   based on the results of the comparing, taking one of a predetermined number of actions; and wherein:
   the first access control list identifies a first group of users who have access to a specified database;
   the second access control list identifies a second group of users who have access to the specified database, and wherein the step of submitting the second access policy includes producing the second access control list by removing some of the users from the first access control list;
   the comparing step includes the step of comparing the second access control list to the first access control list to identify any user who is authorized to take a specified action under the first policy but not authorized to take said specified action under the second policy; and
   the taking step includes the step of modifying said second access policy to authorize said any user to take said specified action.

2. The method according to claim 1, wherein the taking step includes the step of displaying on a display monitor any of said entries which do not have access to said given actions under said second access policy.

3. The method according to claim 1, wherein the taking step includes the step of modifying the second access policy, using one of a group of predefined procedures, based on the results of the comparing.

4. The method according to claim 3, wherein a defined group of users has access to a specified action under the first access policy and do not have access to the specified action under the second access policy, and wherein the modifying step includes the step of altering the second access policy so that said second access policy provides a subset of said group of users with access to the specified action.

5. The method according to claim 1, wherein the comparing includes comparing said entries to the second access policy before the second access policy becomes active.

6. The method according to claim 1, wherein:
the first access policy allows a particular user to have access to a specified action;
the second access policy includes an entry that disallows said particular user to have access to the specified action; and
the step of modifying the second access policy includes the steps of the particular user taking the specified action under the first access control policy, and attempting to take the specified action under the second access control policy, denying the particular user's attempt to take the specified action under the second access control policy; and if said particular user is listed in a given directory, and said particular person took said specified action under the first access control policy within a given length of time prior to attempting to take the specified action under the second access control policy, adding an entry to the second access policy to allow said particular user to have access under the second access policy to the specified action.

7. The method according to claim 1, wherein:
the comparing includes calculating an effective access of a given person under the second access control list, and comparing said effective access to a specific action in the audit log; and
the informing step includes the step of, if said specific action is not allowed to the given person under the second access control list, displaying said specific action to the administrator.

8. A system for determining how a policy change, from a first access policy to a second access policy, would have influenced past access requests, as a predictor of future problems with using the second access policy, the system comprising:
a hardware computer implementing an access control mechanism having a first access policy and an audit log, the first access policy including a first access control list of users and identifying given actions that each of the users on the first access control list has access to; the audit log having entries of accesses made in the past to said given actions under the first access policy as provided to the access control mechanism and implemented by said computer hardware, each entry in the audit log identifying a person and an associated action;
the access control mechanism configured for
receiving a second access policy, including a second access control list of users and identifying actions that each of the users on the second access control list has access to, and wherein some of the users, who made said accesses in the past to said given actions under said first access policy, are denied access to said given actions under the second access policy;
comparing a number of entries on the audit log to the second access control list of users to determine which of the persons, identified in said number of entries in the audit log, are not given access, according to the second access control list of users, to the actions associated with said persons in said number of entries in the audit log; and
based on the results of the comparing, taking one of a predetermined number of actions; and wherein:
the first access control list identifies a first group of users who have access to a specified database;
the second access control list identifies a second group of users who have access to the specified database, and wherein the submitting the second access policy includes forming the second access control list by removing some of the users from the first access control list;
the comparing includes comparing the second access control list to the first access control list to identify any user who is authorized to take a specified action under the first policy but not authorized to take said specified action under the second policy; and
the taking includes modifying said second access policy to authorize said any user to take said specified action.

9. The system according to claim 8, wherein the taking includes displaying on a display monitor any of said entries which do not have access to said given actions under said second access policy.

10. The system according to claim 8, wherein the taking includes modifying the second access policy, using one of a group of predefined procedures, based on the results of the comparing.

11. The system according to claim 10, wherein a defined group of users has access to a specified action under the first access policy and do not have access to the specified action under the second access policy, and wherein the modifying includes altering the second access policy to that said second access policy provides a subset of said group of users with access to the specified action.

12. The system according to claim 8, wherein the comparing includes comparing said entries to a second access policy before the second access policy becomes active.

13. A program storage device readable by machine, tangibly embodying a program of instructions executable by the machine to perform method steps for determining how a policy change, from a first access policy to a second access policy, would have influenced past access requests, as a predictor of future problems with using the second access policy, said method steps comprising:
implementing an access control mechanism having a first access policy, the first access policy including a first access control list of users and identifying given actions that each of the users on the first access control list has access to,
providing an audit log having entries of accesses made in the past to said given actions under the first access policy as provided to the access control mechanism, each entry in the audit log identifying a person and an associated action;
submitting a second access policy to said access control mechanism, the second access policy including a second access control list of users and identifying actions that each of the users on the second access control list has access to, and wherein some of the users, who made said accesses in the past to said given actions under said first access policy, are denied access to said given actions under the second access policy;
comparing a number of entries on the audit log to the second access control list of users to determine which of the persons, identified in said number of entries in the audit log, are not given access, according to the second access control list of users, to the actions associated with said persons in said number of entries in the audit log; and
based on the results of the comparing, taking one of a predetermined number of actions; and wherein
the first access control list identifies a first group of users who have access to a specified database;
the second access control list identifies a second group of users who have access to the specified database, and wherein the step of submitting the second access policy includes producing the second access control list by removing some of the users from the first access control list;

the comparing step includes the step of comparing the second access control list to the first access control list to identify any user who is authorized to take a specified action under the first policy but not authorized to take said specified action under the second policy; and the taking step includes the step of modifying said second access policy to authorize said any user to take said specified action.

14. The program storage device according to claim 13, wherein the taking step includes the step of displaying on a display monitor any of said entries which do not have access to said given actions under said second access policy.

15. The program storage device according to claim 13, wherein the taking step includes the step of modifying the second access policy, using one of a group of predefined procedures, based on the results of the comparing.

16. The program storage device according to claim 15, wherein a defined group of users has access to a specified action under the first access policy and do not have access to the specified action under the second access policy, and wherein the modifying step includes the step of altering the second access policy so that said second access policy provides a subset of said group of users with access to the specified action.

17. The program storage device according to claim 13, wherein the comparing includes comparing said entries to the second access policy before the second access policy becomes active.

* * * * *